United States Patent
Ashmore

(10) Patent No.: US 7,681,089 B2
(45) Date of Patent: Mar. 16, 2010

(54) REDUNDANT STORAGE CONTROLLER SYSTEM WITH ENHANCED FAILURE ANALYSIS CAPABILITY

(75) Inventor: Paul Andrew Ashmore, Longmont, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 478 days.

(21) Appl. No.: 11/676,876

(22) Filed: Feb. 20, 2007

(65) Prior Publication Data
US 2008/0201616 A1    Aug. 21, 2008

(51) Int. Cl.
*G06F 11/00*    (2006.01)
(52) U.S. Cl. .............. 714/57; 714/6; 714/11; 714/25; 714/42; 714/45; 714/56
(58) Field of Classification Search ........... 714/6, 714/11, 25, 42, 45, 46, 57
See application file for complete search history.

(56) References Cited

U.S. PATENT DOCUMENTS

| | | |
|---|---|---|
| 4,217,486 A | 8/1980 | Tawfik et al. |
| 4,251,869 A | 2/1981 | Shaffer |
| 4,428,044 A | 1/1984 | Liron |
| 5,345,565 A | 9/1994 | Jibbe et al. |
| 5,408,644 A | 4/1995 | Schneider et al. |
| 5,483,528 A | 1/1996 | Christensen |
| 5,530,842 A | 6/1996 | Abraham et al. |
| 5,553,023 A | 9/1996 | Lau et al. |
| 5,613,068 A | 3/1997 | Gregg et al. |
| 5,619,642 A | 4/1997 | Nielson et al. |
| 5,619,644 A | 4/1997 | Crockett et al. |

(Continued)

FOREIGN PATENT DOCUMENTS

EP    0800138 A    10/1997

(Continued)

OTHER PUBLICATIONS

Makijarvi, Petri. "PICMG1.3 SHB Raid Performance: Evaluating Next Generation High-Performance PC 4U Computers." Jul. 4, 2007.

(Continued)

*Primary Examiner*—Michael C Maskulinski
*Assistant Examiner*—Charles Ehne
(74) *Attorney, Agent, or Firm*—Thomas J. Lavan; E. Alan Davis

(57) ABSTRACT

A redundant storage controller system that robustly provides failure analysis information (FAI) to an operator of the system is disclosed. The system includes first and second storage controllers in communication with one another, such as via a PCI-Express link. When one of the controllers fails, the FAI is transferred from the failed controller to the surviving controller over the link. The operator issues a command to the surviving storage controller, which responsively provides the FAI. In one embodiment, the failed storage controller writes the FAI to the second storage controller. In one embodiment, each storage controller periodically writes the FAI before there is a failure. In one embodiment, the second storage controller reads the FAI from the failed storage controller. The FAI may include boot logs, crash logs, debug logs, and event logs. The FAI may also be written to a disk drive connected to the controllers.

87 Claims, 9 Drawing Sheets

U.S. PATENT DOCUMENTS

| | | | |
|---|---|---|---|
| 5,668,956 | A | 9/1997 | Okazawa et al. |
| 5,680,579 | A | 10/1997 | Young et al. |
| 5,706,283 | A | 1/1998 | Suzuki |
| 5,754,884 | A | 5/1998 | Swanstrom |
| 5,802,602 | A | 9/1998 | Rahman et al. |
| 5,812,754 | A | 9/1998 | Lui et al. |
| 5,881,254 | A | 3/1999 | Corrigan et al. |
| 6,009,275 | A | 12/1999 | DeKoning et al. |
| 6,038,680 | A | 3/2000 | Olarig |
| 6,058,455 | A | 5/2000 | Islam et al. |
| 6,094,699 | A | 7/2000 | Surugucchi et al. |
| 6,098,140 | A | 8/2000 | Pecone et al. |
| 6,185,652 | B1 | 2/2001 | Shek et al. |
| 6,223,252 | B1 | 4/2001 | Bandera et al. |
| 6,243,829 | B1 | 6/2001 | Chan |
| 6,272,533 | B1 | 8/2001 | Browne |
| 6,397,293 | B2 | 5/2002 | Shrader et al. |
| 6,412,078 | B2 * | 6/2002 | Murotani et al. ............... 714/9 |
| 6,421,769 | B1 | 7/2002 | Teitenberg et al. |
| 6,438,603 | B1 | 8/2002 | Ogus |
| 6,470,429 | B1 | 10/2002 | Jones et al. |
| 6,493,795 | B1 | 12/2002 | Arsenault et al. |
| 6,502,157 | B1 | 12/2002 | Batchelor et al. |
| 6,507,581 | B1 | 1/2003 | Sgammato |
| 6,629,179 | B1 | 9/2003 | Bashford |
| 6,701,449 | B1 * | 3/2004 | Davis et al. .................... 714/4 |
| 6,718,408 | B2 | 4/2004 | Esterberg et al. |
| 6,732,243 | B2 | 5/2004 | Busser et al. |
| 6,839,788 | B2 | 1/2005 | Pecone |
| 6,912,621 | B2 | 6/2005 | Harris |
| 6,944,617 | B2 | 9/2005 | Harriman |
| 7,043,663 | B1 * | 5/2006 | Pittelkow et al. ............... 714/4 |
| 7,046,668 | B2 | 5/2006 | Pettey et al. |
| 7,069,368 | B2 | 6/2006 | Thornton |
| 7,071,946 | B2 | 7/2006 | Jeddeloh |
| 7,107,343 | B2 | 9/2006 | Rinaldis et al. |
| 7,149,819 | B2 | 12/2006 | Pettey |
| 7,457,902 | B2 | 11/2008 | Yang et al. |
| 7,496,694 | B2 * | 2/2009 | Balasubramanian et al. .. 710/15 |
| 2001/0013076 | A1 | 8/2001 | Yamamoto |
| 2002/0029319 | A1 | 3/2002 | Robbins et al. |
| 2002/0069317 | A1 | 6/2002 | Chow et al. |
| 2002/0069334 | A1 | 6/2002 | Hsia et al. |
| 2002/0083111 | A1 | 6/2002 | Row et al. |
| 2002/0091828 | A1 | 7/2002 | Kitamura et al. |
| 2002/0099881 | A1 | 7/2002 | Gugel |
| 2002/0194412 | A1 | 12/2002 | Bottom |
| 2003/0065733 | A1 | 4/2003 | Pecone |
| 2003/0065836 | A1 | 4/2003 | Pecone |
| 2003/0217211 | A1 | 11/2003 | Rust et al. |
| 2004/0064638 | A1 | 4/2004 | Chong, Jr. |
| 2004/0177126 | A1 | 9/2004 | Maine |
| 2004/0221198 | A1 | 11/2004 | Vecoven |
| 2005/0044169 | A1 | 2/2005 | Arbeitman et al. |
| 2005/0102549 | A1 | 5/2005 | Davies et al. |
| 2005/0102557 | A1 | 5/2005 | Davies et al. |
| 2006/0106982 | A1 | 5/2006 | Ashmore et al. |
| 2006/0161707 | A1 | 7/2006 | Davies et al. |
| 2006/0161709 | A1 | 7/2006 | Davies |
| 2006/0230218 | A1 | 10/2006 | Warren et al. |
| 2006/0242312 | A1 | 10/2006 | Crespi et al. |
| 2006/0248308 | A1 | 11/2006 | Wang et al. |
| 2006/0248400 | A1 | 11/2006 | Miyamoto |
| 2006/0277347 | A1 | 12/2006 | Ashmore et al. |
| 2006/0282701 | A1 | 12/2006 | Davies et al. |
| 2007/0124407 | A1 * | 5/2007 | Weber et al. ................. 709/212 |
| 2008/0005410 | A1 | 1/2008 | Mies et al. |
| 2008/0005470 | A1 | 1/2008 | Davies |

FOREIGN PATENT DOCUMENTS

| | | |
|---|---|---|
| EP | 0817054 | 1/1998 |
| EP | 0967552 | 12/1999 |
| GB | 2396726 A | 6/2004 |
| JP | 2001142648 | 5/2001 |
| WO | WO0182077 | 11/2001 |
| WO | WO2006124217 | 11/2006 |
| WO | WO2007002219 | 1/2007 |

OTHER PUBLICATIONS

Luse, Paul. "The Benefits of RAID on Motherboard." May 2003.
Overland Storage. "Tiered Data Protection Made Simple." 2008.
Young et al. *A high I/O reconfigurable crossbar switch.* 11th Annual IEEE Symposium on Field-Programmable Custom Computing Machines, 2003. FCCM 2003. Apr. 9-11, 2003. pp. 3-10.
Landman et al. *Activity-sensitive architectural power analysis.* IEEE Transactions on Computer-Aided Design of Integrated Circuits and Systems. Jun. 1996. pp. 571-587.
U.S. Office Action for U.S. Appl. No. 09/967,027, Apr. 30, 2004, pp. 1-7 and cover sheet.
U.S. Office Action for U.S. Appl. No. 09/967,126, Mar. 7, 2005, pp. 1-5 and cover sheet.
European Examination Report for Application No. GB0406742.7, dated Nov. 10, 2004.
European Examination Report for Application No. GB0406739.3, dated Nov. 10, 2004.
European Examination Report for Application No. GB0406740.1, dated Nov. 10, 2004.
"DCM PCI-X Verification Services" Datasheet #1. DCM Technologies, 39675 Cedar Blvd., #220, Newark, CA 94560.
"PCI-X Synthesizable Core." inSilicon Corporation. San Jose, CA, 1999.
"IBM 133 PCI-X Bridge" Datasheet. Apr. 6, 2001.
"IBM 133 PCI-X Bridge" Datasheet 2000. IBM Microelectronics Division.
"Tsi320™ Software Initialization Application Note." Oct. 2001. 80A600B_AN002_01. Tundra Semiconductor Corporation.
Budruk et al. "PCI Express System Architecture." Addison Wesley Professional. Sep. 4, 2003.
"PCI-X Bus Test Environment." 1999. inSilicon Corporation 411 East Plumeria Dr. San Jose, CA 95134.
"1005 IDT Precise PCI-Express Family Presentation." Integrated Device Technology.
"COMPAQ Rapid Enabler for PCI-X (CREX) Initiator Interface." (Preliminary). Revision 0.28 Sep. 2, 1999.
"COMPAQ Rapid Enabler for PCI-X (CREX) Target Bus Interface." (Preliminary). Revision 0.36 Sep. 2, 1999.
"Intel 41210 Serial to Parallel PCI Bridge Product Brief." Intel Corporation. 2003.
PERICOM. "Bridge Products Road Map." Customer Presentation. pp. 31, 33-35.
IDT. "24-lane 3-Port PCI Express Switch" Product Brief. 89PES24N3. Dec. 22, 2005. Integrated Device Technology, Inc.
"PEX 8104" Data Book. Version 0.61. Mar. 2004. PLX Technology, Inc.
"PEX 8114 PCI Express to PCI/PCI-X Bridge." Product Brief. Version 2.0. 2004. PLX Technology, Inc.
"Tsi320™ PCI/X-to-PCI/X Bus Bridge Manual." Jan. 2001. 80A600B_MA001_02. Tundra Semiconductor Corporation.
"Tsi320™ Dual-Mode PCI-to-PCI Bus Bridge Errata." Sep. 2001. 80A600B_ER001_05. Tundra Semiconductor Corporation.
"Tsi320™ Dual-Mode PCI-to-PCI Bus Bridge User Manual." Jun. 2001. 80A600B_MA001_04. Tundra Semiconductor Corporation.
"Corex-V10 PCI-X Initiator/Target" Datasheet #1. DCM Technologies, 39675 Cedar Blvd., #220, Newark, CA 94560.
"X-caliber Design Specification: PCI-2.2/PCI-X Megacell" Rev 0.99.3. Nov. 19, 1999.
PCI-SIG. PCI Express Base Specification Revision 1.0A. Apr. 15, 2003.
LSI Corporation. MegaRAID SAS 8408E. Product Brief. 2007.

DCM Presentation. DCM Technologies, 39675 Cedar Blvd. #220, Newark, CA 94560.

"PEX 8114: PCI-X -PCI Express Bridge." Data Book. Version 0.70. May 2004. PLX Technology, Inc.

"Corex-V10 PCI-X Initiator/Target" Datasheet #2. DCM Technologies, 39675 Cedar Blvd., #220, Newark, CA 94560.

"DCM Corex-V10 FAQ." version 1.00. DCM Technologies, 39675 Cedar Blvd., #220, Newark, CA 94560.

IDT. "24-lane 3-Port PCI Express Switch" Data Sheet. 89HPES24N3. Feb. 14, 2006. Integrated Device Technology, Inc.

"DCM PCI-X Verification Services" Datasheet #2. DCM Technologies, 39675 Cedar Blvd., #220, Newark, CA 94560.

IDT. "12-lane 3-Port PCI Express Switch" Data Sheet. 89HPES12N3. Feb. 14, 2006. Integrated Device Technology, Inc.

IDT. "12-lane 3-Port PCI Express Switch" Product Brief. 89PES12N3. Feb. 15, 2006. Integrated Device Technology, Inc.

"Intel 41210 Serial to Parallel PCI Bridge Datasheet." Intel Corporation. Sep. 2003.

"Intel 41210 Serial to Parallel PCI Bridge Design Guide." Intel Corporation. Nov. 2003.

QuickLogic PCI Presentation. "QuickPCI™ Family of Embedded Standard Products (ESPs)."

"QL5064—QuickPCI™" DataSheet, Rev B. Feb. 2, 2000. QuickLogic.

"IDT 89HPES12N3 PCI Express Switch." User Manual Table of Contents & Overview. Integrated Device Technology. Feb. 8, 2006.

"IDT 89HPES24N3 PCI Express Switch." User Manual Table of Contents & Overview. Integrated Device Technology. Feb. 8, 2006.

\* cited by examiner

Fig. 2A

Debug Log, Controller A
  02/06 16:49:42  Controller A Booting.
02/06 16:49:42  DateStamp : 02/06 15:06:33
02/06 16:49:42  Entering ReadEventFlashCapi - maxlines=2400, length=156
02/06 16:49:42  Exiting ReadEventFlashCapi - lines = 1656
02/06 16:49:43  ********SP_NTC: ch0 R
02/06 16:49:44  FCR: Get BHR
FOMSRB3
02/06 16:49:44  PFU Mode Normal
02/06 16:49:45  [0]found ISP 2422
02/06 16:49:45  [0]isp_allocate_structures
...
02/06 16:49:45  [0]hard id 0 set to 0x1
02/06 16:49:45  [2]hard id 0 set to 0x1
02/06 16:49:45  [2]Sending Port Enable
02/06 16:49:46  [2]MPI_EVENT_EVENT_CHANGE Events(ON) Change
02/06 16:49:46  PMML_Initialize: Not Resetting Compact Flash
02/06 16:49:46  PMML_Initialize: Compact Flash Inited
...
02/06 16:49:48  DMSSNAP::Initialize SetA hostID=ffh
02/06 16:49:48  AA Cache Initialize B.
02/06 16:49:48  DMSSNAP::Initialize SetB hostID=ffh
02/06 16:49:48  [2]Phy Link Change phy 0 han 0x1 Addr 500c0ff0a491b000
02/06 16:49:48  [2]was down 02/06 16:49:48  [2]NOW UP (3 Gbs)
...
02/06 16:49:48  [2]MPI_EVENT_SAS_DEVICE_STATUS_CHANGE
02/06 16:49:48  [2]FW D OFF
02/06 16:49:48  [2]Received Port Enable Response
02/06 16:49:48  [2]ioc_chip_ready!
02/06 16:49:48  ********SP_NTC: ch0 R
02/06 16:49:48  [2]Initiator Added (DH 0x1 PDH 0x0 Info 0x71)
...
02/06 16:49:48  [2]Add SATA target id 0x17 DH 0x1F PDH 0x12 info 0x81
02/06 16:49:48  [2]Initiator Added (DH 0x20 PDH 0x12 Info 0x71)
02/06 16:49:48  [2]Add SES target id 0x19 DH 0x21 PDH 0x12 info 0x441
02/06 16:50:04  EMP0 500c0ff00a463d3c LEDsOff
02/06 16:50:04  c2fGetFruIdEepromContentsStruct: Undefined string in bytes 0-5: 00 00 00 00 00 00; not setting OUI
02/06 16:50:04  c2fGetFruIdEepromContentsStruct: Can't find signature in FRU data
02/06 16:50:04  slaveProcessUnifiedPacket: FRU type 5 in enclosure 0: FRU data apparently corrupt for
CAPI_COMMAND_U_GET_DRIVE_ENCLOSURE
02/06 16:50:04  c2fGetFruIdEepromContentsStruct: Undefined string in bytes 0-5: 00 00 00 00 00 00; not setting OUI
02/06 16:50:04  c2fGetFruIdEepromContentsStruct: Can't find signature in FRU data
02/06 16:50:04  slaveProcessUnifiedPacket: FRU type 5 in enclosure 0: FRU data apparently corrupt for
CAPI_COMMAND_U_GET_DRIVE_ENCLOSURE
...
02/06 16:50:28  Local PFU Disable = No
02/06 16:50:28  Remote PFU Disable = No
02/06 16:50:28  PFU Not performing upgrade
02/06 16:51:14  EMP write control expander #1 identify = 0
02/06 16:51:14  EMP write control expander #2 identify = 0
02/06 16:51:14  EMP0 500c0ff00a463d3c LEDsOff

*Fig. 2B*

Event ID, Date/Time, Code, Criticality, Controller, Description
    A1  02-06 16:49:44   56  I  A  Storage Controller has booted up. Code version: J102P08epa17   J102P08e (Baselevel: J102P08e     )
    A2  02-06 16:49:46  204  I  A  Hardware Flush p1=2h p2=dh
    A3  02-06 16:49:48  211  I  A  SAS Topology Change: 114 elements, 2 expanders, 1 level, 26 device PHYs
    A4  02-06 16:49:57  195  I  A  AWT PARTNER UP
    A5  02-06 16:49:57   73  I  A  Heartbeat detected from the other RAID controller
    A6  02-06 16:49:58   72  I  A  Recovery initiated, failover set A
    A7  02-06 16:49:59   19  I  A  Rescan for devices is complete. Reason Code: 2. Found 12 drives. Found 1 Drive Enclosure
    A8  02-06 16:49:59   77  I  A  Cache initialized for RAID controller A. WB data found
    A9  02-06 16:50:00   72  I  A  Recovery completed, failover set A
    A10  02-06 16:50:01  111  I  A  Host link up Chan0: 2 Loop IDs, Fabric
    A11  02-06 16:50:01  111  I  A  Host link up Chan1: 2 Loop IDs, Fabric
    A12  02-06 16:50:03   19  I  A  Rescan for devices is complete. Reason Code: 24. Found 12 drives. Found 1 Drive Enclosure
    A13  02-06 16:50:05   28  I  A  Controller configuration parameters have been changed
    A14  02-06 16:50:05  181  I  A  LAN configuration parameters have been set
    A15  02-06 16:50:05  175  I  A  Ethernet link is up for controller A
    A16  02-06 16:50:05  139  I  A  Management Controller has booted up. Code version: W400R36

Fig. 2C

```
Com Port1 Init Done
Testing Microprocessor Memory
Microprocessor memory test OK
64 MB CPU Memory
Init ECC
FLASH LOADER v15.010 May  9 2006 09:04:51
<Hold down the spacebar for Loader Menu>
Loading controller...
Use new code in primary.
...primary FPGA (0x9D)...
E001 = 0x3, E002 = 0xf3
Reading FPGA flash...
Resetting FPGA Configuration Control...
Programming FPGA...
Wait 100uS+ for FPGA CONFIG to enable...
...FPGA Config Done.
Reading controller flash...
...copy primary (0x9D)...decomp...exit loader
CPU: GenuineIntel   563  0000068a 00000001 00000000 0383f9ff
                   03020101 00000000 00000000 0c040841
BoardRevision = 52
BoardModel = 15
Controller Serial Number: 00C0FF0A46DC (64-bit SN = 00c0ff0a46dc0048)
Backplane Type ID: 7
This is Controller A.  Running in Active-Active (Dual ID) mode.
...
SFP 1 is not present!
SFP POST passed.
SCAP: Initial time=73378, cap=100
All diagnostic tests passed.
PTSNAP Initialization Complete.
DMS Initialization Complete.
...
Boot Sequence Complete.
Compact Flash model: CF Card; firmware revision: Ver1.26 .
CF (INFO ): NV Present - Setup Flush, Bad/Missing NV Signature
Compact Flash Flush Speed 11.254 MB/s
Compact Flash Restore Speed 12.421 MB/s
Scanning Disk Channel 0
ID=000 LUN=0: SEAGATE  ST3146854SS    Rev: 9251
ID=001 LUN=0: SEAGATE  ST373454SS     Rev: 9251
...
ID=015 LUN=0: DotHill  R/Evo 2130-2RX  Rev: 1056 [ESP]
Initializing NVRAM Log
      Chunk       Dev
 Type Size Drives Size   CreateInfo
 ------ ----- ------ -------- ----------------------
 ...
Done CT_Init
Kernel Phase 2 Threads started (CM=1).
Array Manager Service (CT_srv) starting
```

Fig. 2D

Critical error -- system will reboot. Release J102P08epa17. Baselevel J102P08e.

...

---------- CTRL-E Screens ----------
       --- Last 25 Events ---
02/06 14:59:29   HOST LINK DOWN   Host Channel 1
02/06 15:02:51   HOST LINK UP   Host Channel 1  osLoop IDs     Fabric
02/06 15:03:18 E CRITICAL ERROR   OSMEnterDebugger 013CE0C  013D466  01D3495 01

...

02/06 16:35:50   HOST LINK DOWN   Host Channel 1
02/06 16:39:10   HOST LINK UP   Host Channel 1  2 Loop IDs     Fabric
      --- Software Configuration ---
SASMap  SC-B Initiator (4 lane) WWN: 500c0ff0a4927000
   Enc0 ExpB0 (x25) WWN: 500c0ff10a463d3f
     Drvs: 00.SAT.3G  01.SAT.3G  02.SAT.3G  03.SAT.3G
       04.SAT  G  05.SAT.3G  06.SAT.3G  07.SAT.3G
       08.SAT.3G  09.SAT.3G  10.SAT.3G  11.SAT.3G

...

CNTRLR  Operating Mode: Active-Active   (Dual ID)
   A-A Status:     Not Failed Over
   A-A Version:   4
   Backoff:    0.1Utility Pri:HIGH
   Alarm Mute: OFF
   Cache Lock:  ON Dyn. Spare:  OFF
   Sync Cache Mode: ynmmediate      MissingLunResponse:Not Ready
TIMEOUT Attempt: 8      Max Retries: 3   Overall: 60
 DISKS  WBCache:Disabled  SMART:  Enabled
   Scrub: Disabled  PFU:   Enabled  FailSMART: Enabled

...

Critical Error Entry Call List (added 2fc000 to CPU addr):
0x44525f 0x438e0c 0x439466 0x4cf495 0x4392cc 0x5ab883 0x5ac8de 0x59f78d
0x5a8b5c 0x5a3e0d 0x5a3ec3 0x5a5dc3 0x5a6609 0x59cfe4 0x5ab9b3 0x43993e
0x4e117b
Stack (at 02C482A8):
02C482C0 0014925F 00000000 00000000 00000001 00000002 02C482DC 0013CE0C

...

00000000 00000000 00000000 00000000 00000000 00000000 00000000 00000000
Executing at ISR level 4 at time of crash.
Current thread = 02C510A8, Name = DBGScreen, State = Ready
Memory Controller ID: a078300c, PCI-X: 100, DDR: 133
IC-Pro Error Registers:
  SErrEnable 0000000e SErrStatus 00000000
  AErr 00000000 AErrAddr 18013800 Cmd 0000000c AttLo 18010000 AttHi 00000008

...

PCIE irq:00000002 ctrl:00000000 status:c0000508 err:00000002
North Bridge PCI Registers:
  EAP=00000000, ERRCMD=02, ERRSTS=0000, PCICMD=0146, PCISTS=2200
  PCI: Terminates a PCI transaction with an unexpected master abort.
South Bridge PCI Registers: NMISC=05, MSTAT=0000
Registers: E00D=b9
PCI_ERR_STS (e040h) = 00
Release J102P08epa17. Baselevel J102P08e. Controller B, IOM SN: 00C0FF0A4927, MP SN: 00C0FF0A463D, CFG SN: YHAL001074.
Other controller is resetting this controller due to the crash.
Select "Unkill" from the other controller to bring this controller back up.

REDUNDANT STORAGE CONTROLLER SYSTEM WITH ENHANCED FAILURE ANALYSIS CAPABILITY

BACKGROUND OF THE INVENTION

Field of the Invention

The present invention relates in general to the field of redundant storage controllers, and particularly to failure analysis thereof.

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One technique for providing high data availability in RAID systems, as well as non-RAID storage systems, is to include redundant fault-tolerant storage controllers in the system. Providing redundant fault-tolerant storage controllers means providing two or more storage controllers such that if one of the controllers fails in a manner that it can no longer perform its intended function, one of the other redundant controllers continues to perform the function of the failed controller. For example, some storage controllers include redundant hot-pluggable field replaceable units (FRUs) such that when a controller fails, an FRU can be quickly replaced in many cases to restore the system to its original data availability level.

Typically, each storage controller maintains a collection of information that is useful in helping an operator to analyze the failure, such as a system administrator or an engineer attempting to debug the failure. For some failure modes, the controller may even have sufficient time to record useful information about the failure. However, because the storage controller is shut down, it cannot provide the failure analysis information to the operator until it is rebooted.

Furthermore, the failure analysis information may be volatile. For example, in some storage controllers the failure analysis information may be stored in a volatile memory, such as DRAM. In this case, the failure analysis information may be overwritten by power-on self tests when the controller reboots. In some storage controllers the volatile memory storing the failure analysis information may be backed by a battery or other rechargeable energy source. In this case, the possibility exists that the battery will run out before the operator obtains the failure analysis information. In some storage controllers the failure analysis information may be stored in a non-volatile memory, such as a FLASH memory. However, having the non-volatile memory may add cost to the storage controller. Furthermore, even if the non-volatile memory is already present for other purposes (i.e., if the cost of the non-volatile memory has already been incurred), writing to non-volatile memories such as FLASH memories typically requires a relatively much larger time than writing to volatile memories such as DRAM, which may be an undesirable solution. Finally, the time required to reboot the storage controller to obtain the failure analysis information may be too long. In some mission-critical applications, it is undesirable to operate in a non-redundant controller mode for any significant amount of time. Thus, if the reboot time is significant, the operator may opt for simply replacing the controller and forgoing access to the failure analysis information, which is disadvantageous, such as to incur a single reboot time rather than potentially incurring two reboot times—one to reboot the failing controller to obtain the failure analysis information only to determine that the controller needs replacing, and a second to boot the new, i.e., replacing, controller.

Furthermore, other failure modes exist in which the failure analysis information is still existent on the controller, yet the failure mode is such that the controller cannot provide the failure analysis information to the operator, even after rebooting the controller. For example, the controller CPU may have failed, but the failure analysis information is still present in the controller memory. In this case, even if the failure analysis information is stored in a non-volatile memory on the failed storage controller or if the battery is still powering the volatile memory storing the failure analysis information, the operator cannot get access to the failure analysis information.

Therefore what is needed is an improved method for providing failure analysis information to an operator of a redundant storage controller system.

BRIEF SUMMARY OF INVENTION

The present invention provides a means for the failure analysis information to be transferred from a failed storage controller to its partner storage controller, from which an operator may obtain the failure analysis information.

In one aspect, the present invention provides a method for robustly providing failure analysis information to an operator of a redundant storage controller system having first and second storage controllers in communication via an inter-controller link. The method includes transferring from the first storage controller to the second storage controller, via the inter-controller link, information for use in analysis of a failure of the first storage controller. The method also includes the second storage controller providing the failure analysis information to the operator.

In another aspect, the present invention provides a redundant storage controller system. The system includes first and second redundant storage controllers, coupled together by a communications link. Each storage controller includes a CPU that generates information for use in analysis of a failure of the storage controller, a memory that receives the information from the other, failed storage controller via the communications link, and an interface coupled to the memory that receives a command from an operator of the system, and in response to the command, provides from the memory of the storage controller the information that was received from the other, failed storage controller.

In another aspect, the present invention provides a storage controller. The storage controller includes a PCI-Express interface, configured to couple to a PCI-Express link, and configured to receive on the PCI-Express link from a failed storage controller coupled to the PCI-Express link information for use in analysis of a failure of the failed storage controller. The storage controller also includes a memory, coupled to the PCI-Express interface, configured to store the received information. The storage controller includes an operator interface, coupled to the memory, configured to receive a command from an operator of the storage controller, and to responsively provide to the operator the received information.

An advantage of the present invention is that it enables the operator to display and analyze the failure analysis information sooner than prior systems in which the failed storage controller would have to be rebooted in order to access the failure analysis information. Additionally, the present invention increases the likelihood that the failure analysis information will be available, particularly where the failed storage controller has failed in a manner such that it cannot reboot, such as a completely failed component, such as a CPU, memory chip, or other vital component. Additionally, the present invention increases the likelihood that the failure analysis information will be available without requiring the failed storage controller to include non-volatile memory for storing the failure analysis information. Additionally, the present invention increases the likelihood that the failure analysis information will be available since the failure analysis information may potentially be provided by the surviving storage controller even if the battery of the failing storage controller fails to keep the volatile memory storing the failure analysis information powered up.

BRIEF DESCRIPTION OF THE DRAWINGS

FIGS. 2A through 2D are example listings of the failure analysis information of FIG. 1 according to the present invention.

DETAILED DESCRIPTION

Figure 1:
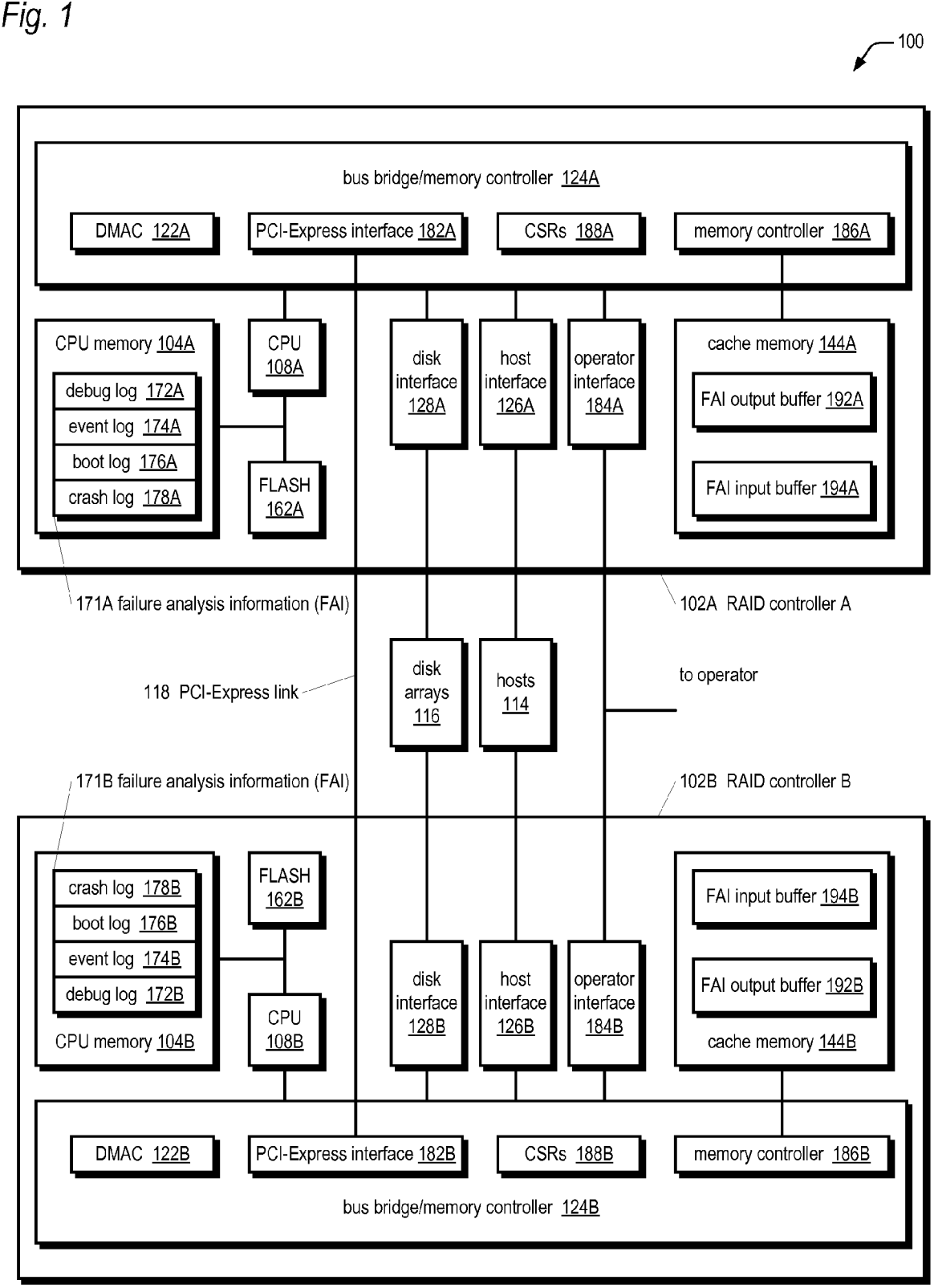
FIG. 1 is a block diagram illustrating a redundant storage controller system with an enhanced failure analysis capability according to the present invention.

Referring now to FIG. 1, a block diagram illustrating a redundant storage controller system 100 with an enhanced failure analysis capability according to the present invention is shown. The system 100 includes two RAID controllers 102. The two RAID controllers 102 are denoted individually RAID controller A 102A and RAID controller B 102B, generically as RAID controller 102, and collectively as RAID controllers 102. The two RAID controllers 102A and 102B are effectively symmetrical, particularly in the sense that either RAID controller 102 can fail (referred to as the failing RAID controller 102 or failed RAID controller 102), and failure analysis information can be transferred to the other RAID controller 102 (referred to as the surviving RAID controller 102), which provides the failure analysis information to an operator for use in analyzing the failure of the failed RAID controller 102.

Each RAID controller 102 includes a CPU 108, a CPU memory 104 coupled to the CPU 108, FLASH memory 162 coupled to the CPU 108, a disk interface 128 for interfacing to disk arrays 116, a host interface 126 for interfacing with host computers 114, an operator interface 184 for interfacing with an operator of the system 100, and a cache memory 144 for caching data transfer between the disk arrays 116 and the hosts 114. A portion of the CPU memory 104 is used to store failure analysis information (FAI) 171. The FAI 171 is described in more detail below with respect to FIG. 2. In various embodiments, all or portions of the FAI 171 may be stored in other memories of the RAID controller 102 rather than, or in addition to, the CPU memory 104, such as in the cache memory 144 or in a non-volatile memory of the RAID controller 102, such as the FLASH memory 162. Each RAID controller 102 also includes a bus bridge/memory controller 124, coupled to the CPU 108, disk interface 128, host interface 126, operator interface 184, and cache memory 144. The bus bridge/memory controller 124 includes a PCI-Express interface 182 for interfacing to a PCI-Express link 118. The bus bridge/memory controller 124 also includes a direct memory access controller (DMAC) 122. The bus bridge/memory controller 124 also includes a memory controller 186 for controlling the cache memory 144. The bus bridge/memory controller 124 also includes control/status registers (CSRs) 188 that are programmable by the CPU 108 for controlling the bus bridge/memory controller 124. The various components of the RAID controllers 102 will be described below in more detail.

Figure 7:
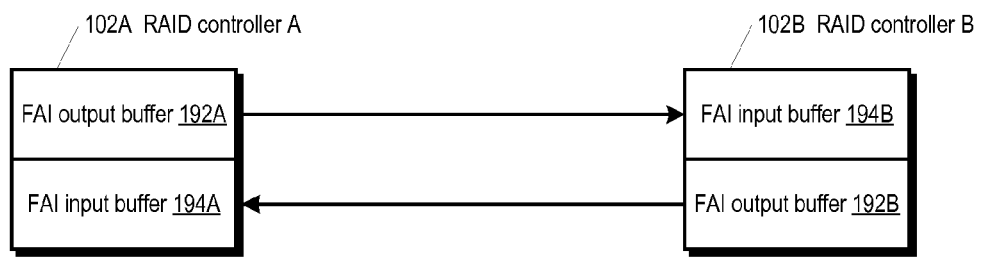
FIG. 7 is a block diagram illustrating the transfer of the failure analysis information between the RAID controllers of FIG. 1 according to the present invention.

A portion of the cache memory 144 is allocated as an FAI output buffer 192, and a portion of the cache memory 144 is allocated as an FAI input buffer 194. The FAI input buffer 194 is used by the surviving RAID controller 102 to receive the FAI 171 from the failing RAID controller 102. In one embodiment, the FAI output buffer 192 is used as a temporary buffer on the failed RAID controller 102 for storing the FAI 171 so that a DMA transfer of the FAI 171 may be performed from the failed RAID controller 102 to the surviving RAID controller 102, as shown in FIG. 7, and as described in more detail below.

The RAID controllers 102 are coupled to one another by a PCI-Express link 118. In one embodiment, the PCI-Express link 118 comprises signal traces on a backplane or mid-plane of a chassis into which the RAID controllers 102 plug. Advantageously, embodiments of the system 100 of the present invention described herein utilize the PCI-Express link 118 to enable the transfer of the FAI 171 between the RAID controllers 102. In particular, when one of the RAID controllers 102 fails, the FAI 171 is transferred from the failing RAID controller 102 to the surviving RAID controller 102 so that an operator of the system 100 can obtain the FAI 171 from the surviving RAID controller 102 in order to analyze the failure of the failed RAID controller 102, as described herein.

The CPU memory 104 of each RAID controller 102 stores program instructions that are fetched and executed by the local CPU 108. The CPU 108 programs the bus bridge/memory controller 124 to transfer the FAI 171 on the PCI-Express link 118 between the RAID controllers 102. In one embodiment, the CPU 108 of the failing RAID controller 102 programs its bus bridge/memory controller 124 to write the FAI 171 from its FAI output buffer 192 to the FAI input buffer 194 of the surviving RAID controller 102. In other embodiments, the CPU 108 of the surviving RAID controller 102 programs its bus bridge/memory controller 124 to read the FAI 171 from the failing RAID controller 102 into the FAI input buffer 194 of the surviving RAID controller 102.

The PCI-Express link 118 is an efficient high-speed serial link designed to transfer data between components within a computer system as described in the PCI Express Base Specification Revision 1.0a, Apr. 15, 2003. The PCI Express specification is managed and disseminated through the PCI Special Interest Group (SIG) found at www.pcisig.com. PCI-Express is a serial architecture that replaces the parallel bus implementations of the PCI and PCI-X bus specification to provide platforms with greater performance, while using a much lower pin count. A complete discussion of PCI Express is beyond the scope of this specification, but a thorough background and description can be found in the following books which are incorporated herein by reference for all purposes:

*Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com. In one embodiment, the RAID controllers 102 are hot-pluggable into the backplane.

Each RAID controller includes a CPU 108, or processor 108, or CPU complex 108. The CPU 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the CPU complex 108 comprises a Transmeta TM8800 processor that includes an integrated North Bridge and an ALi M1563S South Bridge. In another embodiment, the CPU 108 comprises an AMD Elan SC-520 microcontroller. In another embodiment, the CPU 108 comprises an Intel Celeron M processor and an MCH and ICH.

In one embodiment, the CPU memory 104 comprises a double-data-rate (DDR) RAM, and the CPU 108 is coupled to the DDR RAM 104 via a DDR bus, which may be presented by a North Bridge or MCH, for example. In one embodiment, the CPU 108 and bus bridge 124 are coupled by a local bus, such as a PCI, PCI-X, PCI-Express, or other PCI family local bus. In one embodiment, the cache memory 144 comprises a DDR RAM coupled to the bus bridge 124 via a DDR bus. In one embodiment, the host interface 126 and disk interface 128 comprise PCI-X or PCI-Express devices coupled to the bus bridge 124 via respective PCI-X or PCI-Express buses. The cache memory 144 is used to buffer and cache user data as it is transferred between host computers 114 and disk arrays 116 via the host interface 126 and disk interface 128, respectively. In one embodiment, the cache memory 144 is backed up by a rechargeable energy source in case of a loss of main power. In one embodiment, the rechargeable energy source is a battery. In one embodiment, the rechargeable energy source is a super-capacitor. In one embodiment, the FLASH memory 162 initially stores the program instructions executed by the CPU 108 which are copied from the FLASH memory 162 to the CPU memory 104 during boot up of the RAID controller 102.

The disk interface 128 interfaces the RAID controller 102 to the disk arrays 116, which comprise disk drives or other mass storage devices, including but not limited to, tape drives, solid-state disks (SSD), and optical storage devices, such as CDROM or DVD drives. The disk arrays 116 store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 102 reads and writes data from or to the disk arrays 116 in response to I/O requests received from host computers 114. The disk interface 128 is coupled to the bus bridge 124 via a local bus, such as a PCI, PCI-X, PCI-Express, or other PCI family local bus.

The host interface 126 interfaces the RAID controller 102 with the host computers 114. In one embodiment, the RAID controller 102 is a local bus-based controller, such as a controller that plugs into, or is integrated into, a local I/O bus of the host computer system 114, such as a PCI, PCI-X, CompactPCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the RAID controller 102 is a standalone controller in a separate enclosure from the host computers 114 that issue I/O requests to the RAID controller 102. For example, the RAID controller 102 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like. The host interface 126 is coupled to the bus bridge 124 via a local bus, such as a PCI, PCI-X, PCI-Express, or other PCI family local bus.

The CPU 108, host interface 126, and disk interface 128, read and write data from and to the cache memory 144 via the bus bridge 124. The CPU 108 fetches and executes instructions of programs stored in the CPU memory 104 that control the transfer of data between the disk arrays 116 and the hosts 114. The CPU 108 receives commands from the hosts 114 to transfer data to or from the disk arrays 116. In response, the CPU 108 issues commands to the disk interface 128 to accomplish data transfers with the disk arrays 116. Additionally, the CPU 108 provides command completions to the hosts 114 via the host interface 126. The CPU 108 may also perform storage controller functions such as RAID control, logical block translation, buffer management, and data caching.

The operator interface 184 enables an operator, such as a system administrator or a hardware or software engineer, to obtain from the surviving RAID controller 102 the FAI 171 generated by the failed RAID controller 102 in order to analyze a failure of the failed RAID controller 102. The operator interface 184 may include, but is not limited to, any of the following interfaces: Ethernet, RS-232, USB, FibreChannel, and the like. The operator interface 184 provides a means for the operator to submit commands to the RAID controller 102 to request the FAI 171 and provides a means for the RAID controller 102 to responsively provide the FAI 171 to the operator, either for display or for storage on a non-volatile storage medium. In one embodiment, the operator interface 184 comprises a distinct management subsystem of the RAID controller 102 that includes its own CPU domain, but which is communicative with the cache memory 144 to obtain the FAI 171 and provide it to the operator.

Referring now to FIG. 2, listings of an example of the FAI 171 of FIG. 1 according to the present invention are shown. FIG. 2A is an example listing of a debug log 172. FIG. 2B is an example listing of a event log 174. FIG. 2C is an example listing of a boot log 176. FIG. 2D is an example listing of a crash log 178.

The debug log 172 contains debug messages selectively printed by the RAID controller 102 firmware. The debug log 172 contains useful print messages generated during normal operation of the RAID controller 102 firmware. For example, when the RAID controller 102 discovers a new disk drive, the RAID controller 102 prints a listing of each known drive, its channel and target identifier, its size and whether it is a member of a disk array 116 or has other use, such as a hot spare or available drive. The debug log 172 contains timestamps for each print statement. If the firmware executes certain code paths, they are traced. The debug log 172 prints may include an indication of which module of the firmware generated the print. In one embodiment, the debug log 172 is stored in the CPU memory 104, and the CPU memory 104 is a volatile memory. Consequently, the present invention advantageously provides a means of transferring the debug log 172 from the failing RAID controller 102 to the surviving RAID controller 102 for provision to the operator.

The event log 174 contains information regarding important system-level events. When the RAID controller 102 creates or deletes a disk array 116, the RAID controller 102 creates an entry in the event log 174. The RAID controller 102 also creates an entry in the event log 174, for example, when the RAID controller 102 detects any of the following events: an over-temperature event; a super-capacitor or battery fails; a super-capacitor finishes re-charging; detection of a new or lost disk drive; or a serious hardware error in the system 100. In one embodiment, the event log 174 is stored in the FLASH memory 162.

The crash log 178 contains information about the state of the CPU 108, such as register values and stack contents, and the state of the operating system portion of the firmware, which enables a backtrace to be performed. For example, in one embodiment, the RAID controller 102 firmware includes a modified version of the Linux operating system, and the crash log 178 comprises a Linux crash dump. In one embodiment, the RAID controller 102 stores up to four of the most recent crash dumps. The crash log 178 contains a collection of internal variables and memory structures printed in a human readable form. In one embodiment, the crash log 178 includes current environmental state at the time of the crash, such as temperatures, voltages, and the like.

The boot log 176 contains messages indicating various stages reached during the boot process of the RAID controller 102, which includes, for example, CPU identification information, CPU speed, memory size attached, Power On Self Test (POST) results, presence or absence of various optional hardware components, list of disk drives found during an initial scan.

Figure 3:
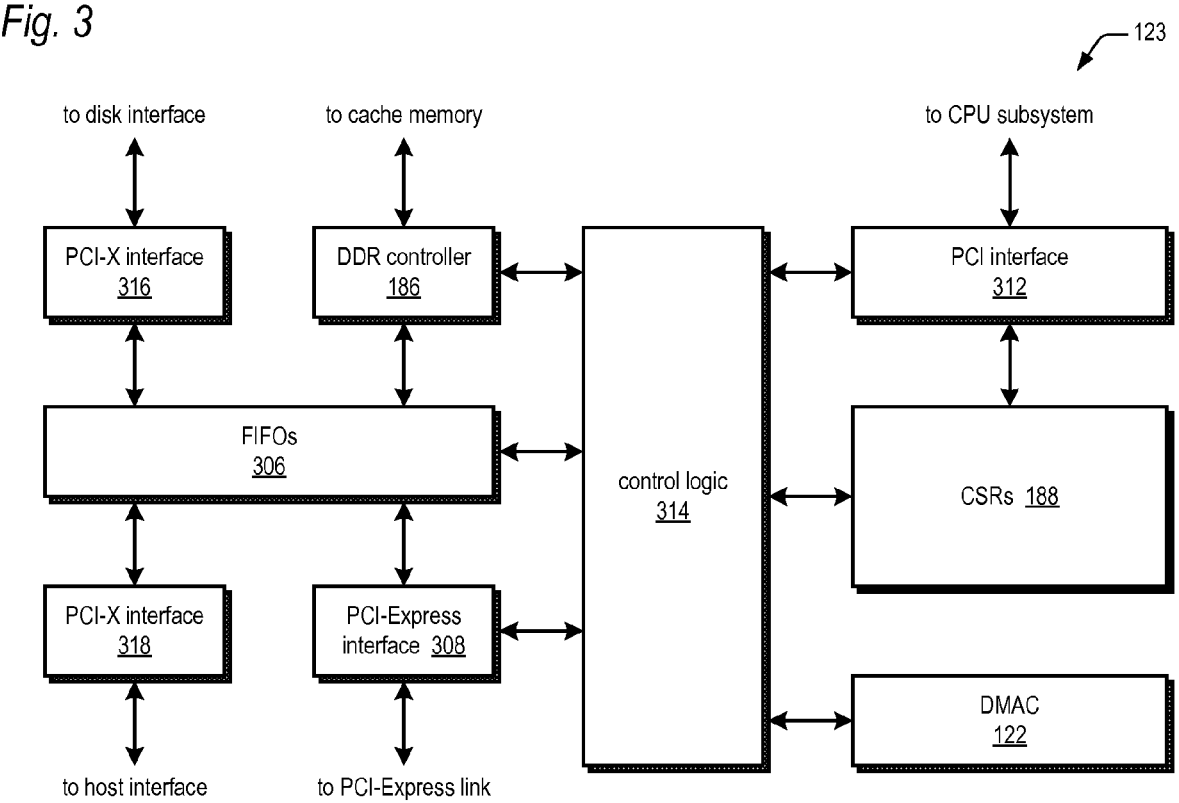
FIG. 3 is a block diagram illustrating in more detail the bus bridge/memory controller of FIG. 1 according to the present invention.

Referring now to FIG. 3, a block diagram illustrating in more detail the bus bridge/memory controller 124 of FIG. 1 according to the present invention is shown. The bus bridge 124 includes control logic 314 for controlling various portions of the bus bridge 124 as described below.

The bus bridge 124 also includes a local bus interface 316 (such as a PCI-X interface) for interfacing the bus bridge 124 to the disk interface 128; another local bus interface 318 (such as a PCI-X interface) for interfacing the bus bridge 124 to the host interface 126; a memory controller 186 of FIG. 1 (such as a DDR SDRAM controller) for interfacing the bus bridge 124 to the cache memory 144; and a PCI-Express interface 308 for interfacing the bus bridge 124 to the PCI-Express link 118. The local bus interfaces 316 and 318, memory controller 186, and PCI-Express interface 308 are all coupled to the control logic 314 and are also coupled to buffers 306 (such as first-in-first-out (FIFO) buffers) that buffer data transfers between the various interfaces and provide parallel high-speed data paths there between. The bus bridge 124 also includes a local bus interface 312, such as a PCI or PCI-X interface, coupled to the control logic 314, for interfacing the bus bridge 124 to the CPU 108 and CPU memory 104. The CPU 108 accesses the cache memory 144, disk interface 128, and host interface 126 via the PCI interface 312. The CSRs 188 of FIG. 1 are coupled to the control logic 314 and to the PCI interface 312.

The PCI-Express interface 308 performs the PCI-Express protocol on the PCI-Express link 118, including transmitting and receiving PCI-Express packets, such as PCI-Express transaction layer packets (TLPs) and data link layer packets (DLLPs), and in particular memory read and write request TLPs. In one embodiment, the PCI-Express interface 308 substantially conforms to relevant portions of the PCI Express Base Specification Revision 1.0a, Apr. 15, 2003.

The control logic 314 is coupled to the direct memory access controller (DMAC) 122 of FIG. 1 that is programmable by the CPU 108 to perform a direct memory data transfer from a location in cache memory 144 of the failing RAID controller 102 to a location in the cache memory 144 of the surviving RAID controller 102, as described in U.S. patent application Ser. No. 11/178,727, which is hereby incorporated by reference in its entirety. Embodiments are also contemplated in which the DMAC 122 is also programmable by the CPU 108 to perform a direct memory data transfer from a location in the CPU memory 104 of the failing RAID controller 102 to the surviving RAID controller 102B, as described in U.S. patent application Ser. No. 11/329,470, which is hereby incorporated by reference in its entirety. The data may comprise the FAI 171 of FIG. 1.

In one embodiment, the DMAC 122 is capable of transferring a series of physically discontiguous data chunks whose memory locations are specified by a scatter/gather list whose base address the processor 108 programs into an address register. If the failing RAID controller 102 is initiating the DMA transfer to the surviving RAID controller 102, the DMAC 122 uses the scatter/gather list address/length pairs to transmit one or more PCI-Express memory write request transaction layer packets (TLPs), whose payloads include the data chunks, over the PCI-Express link 118 to the FAI input buffer 194 of the surviving RAID controller 102. In one embodiment, the scatter/gather list may specify one or more locations in the FAI output buffer 192 of the failing RAID controller 102. In another embodiment, the scatter/gather list may specify a mix of source addresses from the cache memory 144, CPU memory 104, and/or FLASH memory 162. If the surviving RAID controller 102 is initiating the DMA transfer from the failing RAID controller 102, the DMAC 122 uses the scatter/gather list address/length pairs to transmit one or more PCI-Express memory read request TLPs, whose headers specify one or more source addresses of the FAI 171 on the failing RAID controller 102.

Figure 4:
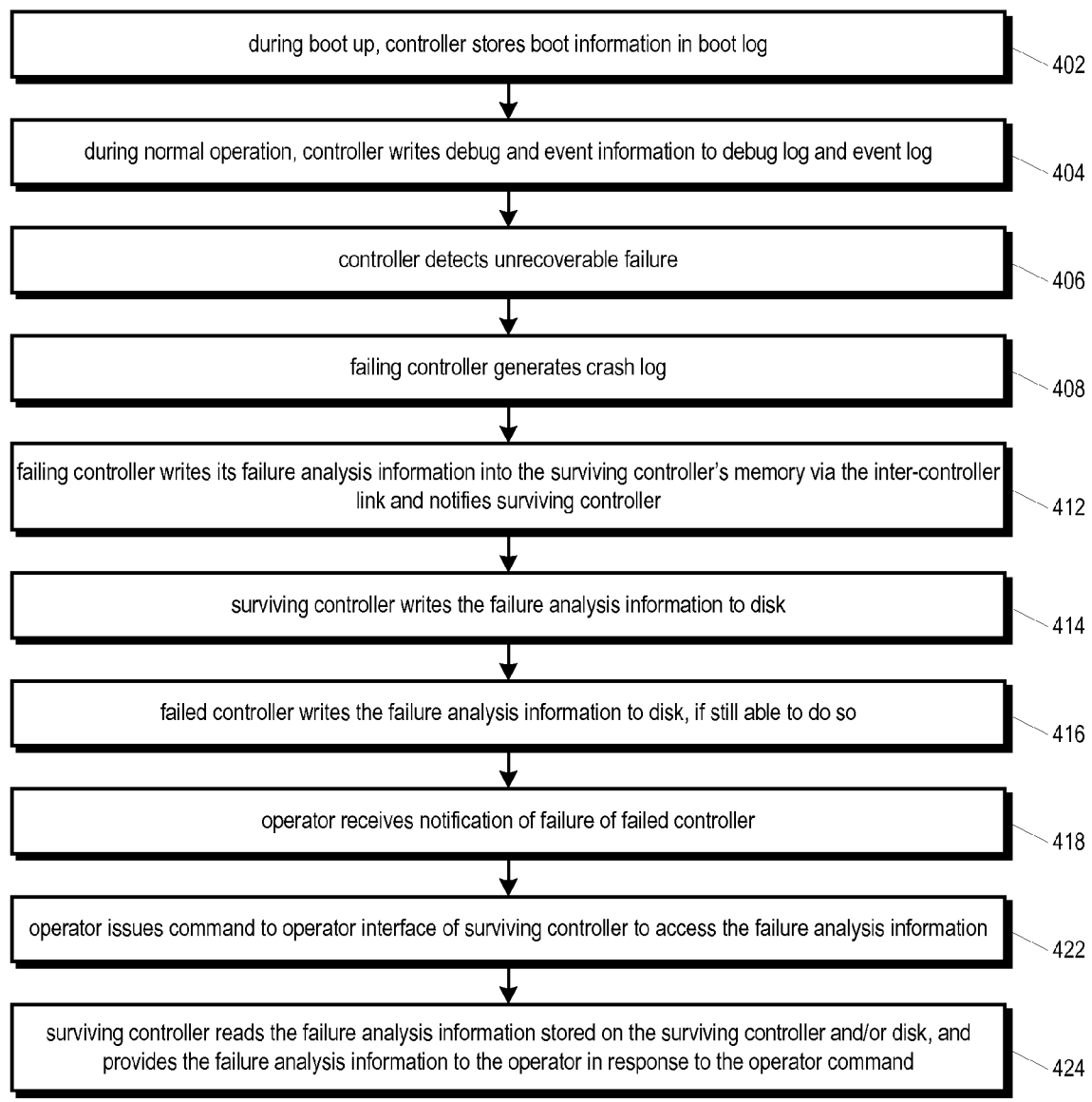
FIGS. 4, 5, and 6 are a flowchart illustrating operation of system of FIG. 1 according to alternate embodiments of the present invention.

Referring now to FIG. 4, a flowchart illustrating operation of system 100 of FIG. 1 according to the present invention is shown. Flow begins at block 402.

At block 402, one of the RAID controllers 102 of FIG. 1 boots up. The booting RAID controller 102 is assumed to fail in the flow of FIG. 4. It is assumed that the other RAID controller 102 is already booted up. The already-booted RAID controller 102 is assumed to survive in the flow of FIG. 4. During boot up, the RAID controller 102 stores boot information to the boot log 176 of FIG. 1. Flow proceeds to block 404.

At block 404, the RAID controller 102 has booted and is performing normal operations. That is, the RAID controller 102 is servicing I/O requests from the host computers 114 and responsively transferring data between the host computers 114 and the disk arrays 116. During normal operation, the RAID controller 102 writes information to the debug log 172 as various portions of the firmware execute that print to the debug log 172. Additionally, the RAID controller 102 writes information to the event log 174 as various events occur that the firmware recognizes should be indicated in the event log 174. Flow proceeds to block 406.

At block 406, the RAID controller 102 detects an unrecoverable failure. An unrecoverable failure is a failure that cannot be remedied during normal operation by the firmware executing on the CPU 108. In the context of FIG. 4, an unrecoverable failure may require the RAID controller 102 to voluntarily shut itself down. In one embodiment, the failing RAID controller 102 shuts itself down by disabling its host interface 126 so that it no longer responds on the network, thereby enabling the surviving RAID controller 102 to take over the identity of the failing RAID controller 102 on the network, i.e., to receive I/O requests from the host computers 114 for the failing RAID controller 102. In one embodiment, the failing RAID controller 102 also shuts itself down by disabling the disk interface 128 to enable the surviving RAID controller 102 to take over sending commands to the disks of the disk arrays 116 that were previously owned by the failing RAID controller 102. The failing RAID controller 102 does not voluntarily shut down portions of itself until after it has performed other steps, such as those at blocks 408, 412, and 416. An unrecoverable failure may be discovered by diagnostic code at boot time, such as power on self tests (POST). It is noted that if the failing controller 102 fails during boot up, then the step at block 404 will not be performed. Many causes of failure may occur, such as the following examples: the temperature of a critical component within the system becomes excessive, such as components of the RAID controller 102, causing the component to fail; the RAID controller 102 detects out-of-tolerance condition, such as that the temperature of a component has become excessive before an actual failure occurs, and shuts itself down; the RAID controller 102 detects a faulty hardware condition, such as a memory parity or ECC error, or invalid data received from a disk interface 128, host interface 126, operator interface 184, or bus bridge/memory controller 124; or, the CPU 108 detects an illegal or unanticipated software condition, such as a state machine error, bad pointer, or corrupted memory location. Flow proceeds to block 408.

At block 408, the failing RAID controller 102 generates a crash log 178 in response to detecting the failure. Flow proceeds to block 412.

At block 412, the failing RAID controller 102 writes the FAI 171 to the FAI input buffer 194 of the surviving RAID controller 102 via the PCI-Express link 118. In one embodiment, the CPU 108 of the failing RAID controller 102 copies the FAI 171 from its locations on the failing RAID controller 102—such as the CPU memory 104, the cache memory 144, and the FLASH memory 162—to its FAI output buffer 192 and then programs the DMAC 122 of its bus bridge/memory controller 124 to perform a DMA transfer of the FAI 171 from the FAI output buffer 192 across the PCI-Express link 118 into the FAI input buffer 194 of the surviving RAID controller 102 via the bus bridge/memory controller 124 of the surviving RAID controller 102, a shown in FIG. 7. In one embodiment, the CPU 108 of the failing RAID controller 102 performs a series of load and store operations to transfer the FAI 171 to the surviving RAID controller 102. In particular, the CPU 108 of the failing RAID controller 102 loads the FAI 171 from its locations on the failing RAID controller 102 and stores the data to the FAI input buffer 194 of the surviving RAID controller 102. In this embodiment, the bus bridge/memory controller 124 of the failing RAID controller 102 recognizes the store addresses as being in an address range mapped to the surviving RAID controller 102. In one embodiment, the CSRs 188 include registers programmable by the CPU 108 that specify the base address and length of the FAI input buffer 194 of the surviving RAID controller 102, which enables the bus bridge/memory controller 124 of the failing RAID controller 102 to recognize that the store addresses are destined for the surviving RAID controller 102. In response, the bus bridge/memory controller 124 of the failing RAID controller 102 writes the FAI 171 data specified by the store operations over the PCI-Express link 118 to the bus bridge/memory controller 124 of the surviving RAID controller 102, which responsively writes the FAI 171 data to the address specified by the store operations, namely the FAI input buffer 194 of the surviving RAID controller 102. In addition to writing the FAI 171 to the surviving RAID controller 102, the failing RAID controller 102 notifies the surviving RAID controller 102 that the failing RAID controller 102 has failed and has written the FAI 171 to the surviving RAID controller 102. In one embodiment, the failing RAID controller 102 notifies the surviving RAID controller 102 of the failure by transmitting a message to the surviving RAID controller 102 via the PCI-Express link 118. In one embodiment, the transfer of the FAI 171 or the message interrupts the CPU 108 of the surviving RAID controller 102, such as described in U.S. patent application Ser. No. 11/178,727. Flow proceeds to block 414.

At block 414, the surviving RAID controller 102 writes the FAI 171 received from the failing RAID controller 102 into the FAI input buffer 194 at block 412 to a disk drive connected to the surviving RAID controller 102. In one embodiment, the surviving RAID controller 102 writes the FAI 171 to an unused disk, such as a hot spare or disk that is available for inclusion in a disk array 116. In one embodiment, the target disk may be included in a disk array 116, and the surviving RAID controller 102 writes the FAI 171 to a portion of the disk that is not used to store user data, but is instead reserved for the storage of failure analysis information. Flow proceeds to block 416.

At block 416, if the failing RAID controller 102 is still operational enough to do so, it writes the FAI 171 to a disk drive connected to both the failing RAID controller 102 and the surviving RAID controller 102. This enables the surviving RAID controller 102 to obtain the FAI 171 from the disk. In one embodiment, the portion of the RAID controller 102 firmware that writes the FAI 171 to disk in the event of a failure includes a simplified disk device driver that is capable of operating with a minimal amount of functioning hardware on the failing RAID controller 102, namely the CPU 108, CPU memory 104, bus bridge/memory controller 124, and disk interface 128. Embodiments are contemplated in which the steps at block 414, 416 and 508 (of FIG. 5 below) are optional, particularly if the necessary hardware and software are no longer operational. Flow proceeds to block 418.

At block 418, the operator receives notification of the failure of the failing RAID controller 102. The operator may receive the notification in various ways, including but not limited to, the following. Either or both of the RAID controllers 102 may provide the notification. In one embodiment, the RAID controller 102 provides a visual notification to the operator via the operator interface 184, such as via a webpage, graphical user interface, or text message. In one embodiment, the RAID controller 102 pages the operator via a digital pager. In one embodiment, the RAID controller 102 provides a visual notification via an LED on its faceplate. In one embodiment, the RAID controller 102 provides an audible notification of the failure. In one embodiment, the operator simply notices the inability to access one or more of the disk arrays 116, or notices a performance reduction in the system 100. An engineer may be dispatched to the site of the failing RAID controller 102 to debug the failure in response to the system operator detecting the failure. Flow proceeds to block 422.

At block 422, the operator issues a command to the operator interface 184 of the surviving RAID controller 102 to access the FAI 171. Flow proceeds to block 424.

At block 424, the surviving RAID controller 102 accesses the FAI 171 that is stored in either the FAI input buffer 194 or on the disk drive written at block 414 and/or block 416, and provides the FAI 171 to the operator, in response to the command issued at block 422. In one embodiment, the FAI 171 provided by the surviving RAID controller 102 is obtained by the system administrator and provided to a hardware or software engineer for use in debugging the failure. In one embodiment, the operator issues the command and receives the FAI 171 via the host interface 126, rather than the operator interface 184. Flow ends at block 424.

Figure 5:
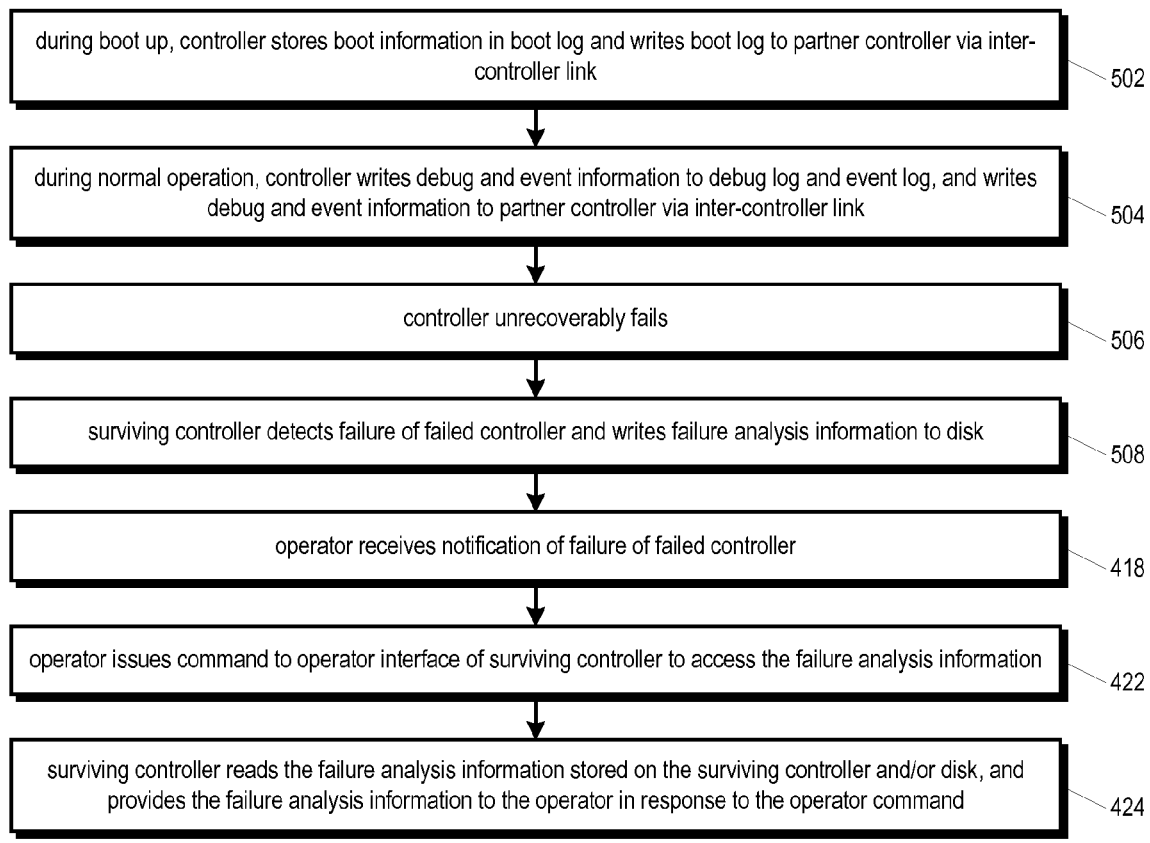

Referring now to FIG. 5, a flowchart illustrating operation of system 100 of FIG. 1 according to an alternate embodiment of the present invention is shown. In the embodiment of FIG. 5, each RAID controller 102 periodically writes the FAI 171 to the other RAID controller 102, regardless of whether a failure has occurred. This operation has the advantage that if one of the RAID controllers 102 fails, particularly if it fails so catastrophically that it cannot notify the surviving RAID controller 102, and cannot write the FAI 171 to the surviving RAID controller 102, and perhaps cannot even generate a crash log 178, whatever FAI 171 was generated and written to the surviving RAID controller 102 prior to the catastrophic failure will be available from the surviving RAID controller 102. Flow begins at block 502.

At block 502, during boot up, the RAID controller 102 (which will become the failing RAID controller 102) stores boot information to the boot log 176 of FIG. 1, similarly to the step performed at block 402 of FIG. 4. Additionally, the RAID controller 102 writes the boot information to the FAI input buffer 194 of the partner, i.e., surviving, RAID controller 102 via the PCI-Express link 118. Flow proceeds to block 504.

At block 504, during normal operation, the RAID controller 102 writes information to the debug log 172 and event log 174, similarly to the step performed at block 404 of FIG. 4. Additionally, the RAID controller 102 writes the debug and event information to the FAI input buffer 194 of the partner RAID controller 102 via the PCI-Express link 118. In one embodiment, the RAID controller 102 writes the debug and event information to the partner RAID controller 102 each time the RAID controller 102 writes the debug and event information to itself. In this embodiment, the print routine may include code which not only writes the information to its own local memory, but also writes the information to the FAI input buffer 194 of the partner RAID controller 102. In another embodiment, the RAID controller 102 only writes the debug and event information to the partner RAID controller 102 on a periodic basis, rather than each time it writes to the information to itself. Flow proceeds to block 506.

At block 506, the RAID controller 102 unrecoverably fails. The failure may be similar to those described with respect to the step a block 406 of FIG. 4. Flow proceeds to block 508.

At block 508, the surviving RAID controller 102 detects the failure of the failing RAID controller 102. The surviving RAID controller 102 may detect the failure in various ways including, but not limited to, the following. In one embodiment, the two RAID controllers 102 each periodically transmit a heartbeat message to one another, such as via the PCI-Express link 118, and the surviving RAID controller 102 detects a failure of the failing RAID controller 102 by detecting the lack of a heartbeat from the failing RAID controller 102 for a predetermined amount of time. In one embodiment, the failing RAID controller 102 notifies the surviving RAID controller 102 of the failure. In response, the surviving RAID controller 102 writes the FAI 171 from the FAI input buffer 194 to a disk drive, similarly to the step performed at block 414 of FIG. 4. Flow proceeds from block 508 to block 418 and proceeds through blocks 422 and 424 in a manner similar to that described above with respect to like-numbered blocks of FIG. 4.

Figure 6:
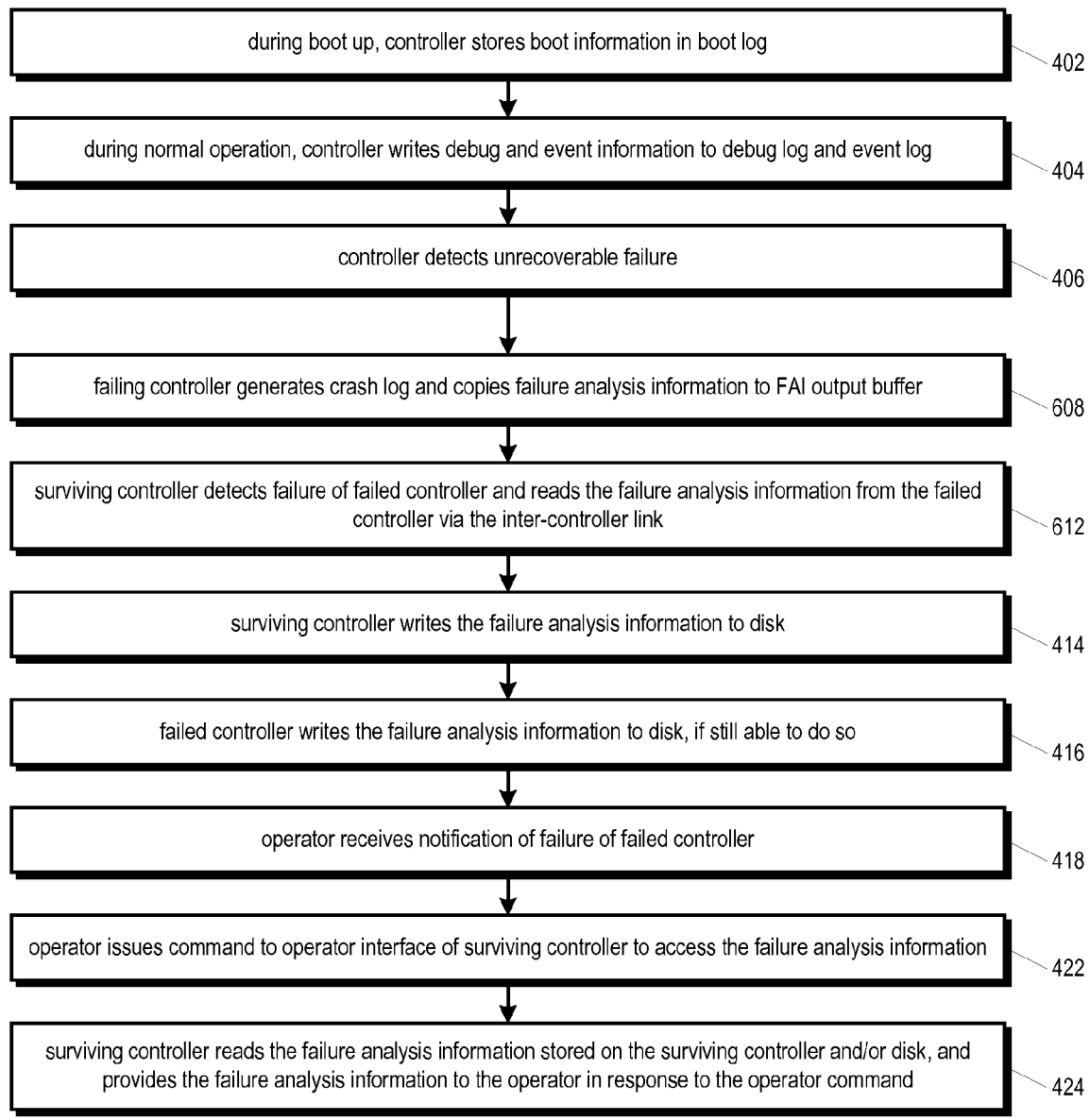

Referring now to FIG. 6, a flowchart illustrating operation of system 100 of FIG. 1 according to an alternate embodiment of the present invention is shown. The flowchart of FIG. 6 is similar to the flowchart of FIG. 4, and like-numbered blocks are similar. However, in FIG. 6, blocks 408 and 412 of FIG. 4 are replaced by blocks 608 and 612; that is, in FIG. 6, flow proceeds from block 406 to block 608 rather than to block 408, and flow proceeds to block 414 from block 612 rather than from block 412.

At block 608, the failing RAID controller 102 generates a crash log 178 in response to detecting the failure. Additionally, the failing RAID controller 102 copies the FAI 171 to its FAI output buffer 192. Flow proceeds to block 612.

At block 612, the surviving RAID controller 102 detects the failure of the failing RAID controller 102 similarly to the step performed at block 508 of FIG. 5. In response to detecting the failure of the failing RAID controller 102, the surviving RAID controller 102 reads the FAI 171 from the FAI output buffer 192 of the failing RAID controller 102 into the FAI input buffer 194 of the surviving RAID controller 102, rather than the failing RAID controller 102 writing the FAI 171 as in the flowchart of FIG. 4. In one embodiment, the surviving RAID controller 102 programs the DMAC 122 of its bus bridge/memory controller 124 to perform a DMA transfer of the FAI 171 from the FAI output buffer 192 of the failing RAID controller 102 across the PCI-Express link 118 into the FAI input buffer 194 of the surviving RAID controller 102 via the bus bridge/memory controller 124, as shown in FIG. 7. In one embodiment, the CPU 108 of the surviving RAID controller 102 performs a series of load and store operations to transfer the FAI 171 from the FAI output buffer 192 of the failing RAID controller 102 to the surviving RAID controller 102. In particular, the surviving RAID controller 102 loads the FAI 171 from the FAI output buffer 192 on the failing RAID controller 102 and stores the data to the FAI input buffer 194 of the surviving RAID controller 102. In this embodiment, the bus bridge/memory controller 124 of the surviving RAID controller 102 recognizes the load addresses as being in an address range mapped to the failing RAID controller 102. In one embodiment, the CSRs 188 include registers programmable by the CPU 108 that specify the base address and length of the FAI output buffer 192 of the failing RAID controller 102, which enables the bus bridge/memory controller 124 of the surviving RAID controller 102 to recognize that the load addresses are destined for the failing RAID controller 102. In response, the bus bridge/memory controller 124 of the surviving RAID controller 102 transmits PCI-Express memory read TLPs on the PCI-Express link 118 to read the FAI 171 data specified by the load operations over the PCI-Express link 118. The bus bridge/memory controller 124 of the failing RAID controller 102 responsively reads the FAI 171 data from the address specified by the load operations, namely the FAI output buffer 192 of the failing RAID controller 102. The bus bridge/memory controller 124 of the failing RAID controller 102 then transmits PCI-Express memory write TLPs to transfer the specified data over the PCI-Express link 118 to the bus bridge/memory controller 124 of the surviving RAID controller 102, which responsively provides the FAI 171 data to the CPU 108 of the surviving RAID controller 102. The CPU 108 of the surviving RAID controller 102 then writes the FAI 171 data to the desired location in the surviving RAID controller 102. Flow proceeds from block 612 to block 414 and proceeds through blocks 416, 418, 422 and 424 in a manner similar to that described above with respect to like-numbered blocks of FIG. 4.

An advantage of the embodiment of FIG. 6 is that there may be some failure modes in which the failing RAID controller 102 is unable to notify the surviving RAID controller 102 of the failure and/or to write the FAI 171 to the surviving RAID controller 102; however, the failing RAID controller 102 may be functional enough for the surviving RAID controller 102 to read the FAI 171 from the failing RAID controller 102. For example, as long as the bus bridge/memory controller 124 and cache memory 144 of the failing RAID controller 102 are functioning properly, the surviving RAID controller 102 may read the FAI 171 from the failing RAID controller 102 cache memory 144, even if other components of the failing RAID controller 102 are failed, such as the disk interface 128, host interface 126, operator interface 184, or CPU 108.

Furthermore, it is noted that the failing RAID controller 102 may fail in such a way that it is not capable of generating the crash log 178 or copying the FAI 171 to the FAI output buffer 192 at block 608. An embodiment is contemplated in which each of the RAID controllers 102 periodically copies the FAI 171 to its FAI output buffer 192 during boot and during normal operation, analogously to the operation described at blocks 502 and 504 of FIG. 5, so that the at least the boot log 176, debug log 172, and event log 174 information are present in the FAI output buffer 192. This enables the surviving RAID controller 102 to read the contents of the FAI output buffer 192 of the failing RAID controller 102 at block 612. Hence, the operator may still be able to obtain the boot log 176, debug log 172, and event log 174 from the surviving RAID controller 102, which may be useful for debugging the failure.

An embodiment is contemplated in which the CSRs 188 and the DMAC 122 of the bus bridge/memory controller 124 are configured to enable the surviving RAID controller 102 to read from the CPU memory 104 of the failing RAID controller 102. In this embodiment, at block 612, the surviving RAID controller 102 reads relevant portions of the CPU memory 104 of the failing RAID controller as an extended crash dump for debugging purposes. This embodiment may be particularly advantageous for failure modes in which the CPU 108 on the failing RAID controller 102 is unable to generate a crash log 178 or copy the FAI 171 to its FAI output buffer 192. Advantageously, as long as the bus bridge/memory controller 124, CPU memory 104, and necessary portions of the CPU complex 108 are functioning properly, the surviving RAID controller 102 may read the FAI 171 from the failing RAID controller 102 CPU memory 104, even if other components of the failing RAID controller 102 are failed, such as the disk interface 128, host interface 126, operator interface 184, or CPU 108.

As may be observed from FIGS. 4 through 6, the FAI 171 may be transferred from the failing RAID controller 102 to the surviving RAID controller 102 either by the failing RAID controller 102 or by the surviving RAID controller 102, and may be transferred in response to various events. Importantly, the FAI 171 is transferred to the surviving RAID controller 102 so that the surviving RAID controller 102 may provide the FAI 171 to the operator. Furthermore, embodiments are contemplated in which combinations of the methods and causes of transferring the FAI 171 from the failing RAID controller 102 to the surviving RAID controller 102 are employed in order to obtain the union of the sets of advantages of each method and may increase the number of failure modes for which the FAI 171 may be provided to the operator.

Although the present invention and its objects, features, and advantages have been described in detail, other embodiments are encompassed by the invention. For example, although embodiments are described in which the redundant system includes RAID controllers, the present invention is not limited to use in redundant systems with RAID controllers, but may be employed in redundant systems having various types of storage controllers. Additionally, the present invention is not limited to use in a system of two storage controllers, but may be employed in redundant systems having more than two storage controllers. Still further, although embodiments are described in which the inter-controller link is a PCI-Express link 118, other embodiments are contemplated in which the inter-controller link is of another type, such as Fibre-Channel, SAS, Ethernet, Infiniband, $I^2C$, and the like, and may be any type of communications link that enables the transfer of failure analysis information between a failing storage controller and a surviving storage controller. Finally, although embodiments have been described in which the RAID controllers 102 include a separate cache memory 144 and CPU memory 104, other embodiments are contemplated in which these memories are unified.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for robustly providing failure analysis information to an operator of a redundant storage controller system having first and second storage controllers in communication via an inter-controller link, the method comprising:
   transferring from the first storage controller to the second storage controller, via the inter-controller link, information for use in analysis of a failure of the first storage controller; and
   providing, by the second storage controller, the failure analysis information to the operator;
   wherein the second storage controller performs said providing the failure analysis information to the operator before the first storage controller is rebooted.

2. The method of claim 1, wherein said transferring the failure analysis information comprises:
   writing, by the first storage controller, the failure analysis information to the second storage controller via the inter-controller link.

3. The method of claim 2, further comprising:
   detecting, by the first storage controller, the failure;
   wherein the first storage controller performs said writing in response to said detecting.

4. The method of claim 3, further comprising:
   collecting the failure analysis information, by the first storage controller, in response to said detecting, and prior to said writing.

5. The method of claim 4, wherein said collecting the failure analysis information, by the first storage controller, is also performed periodically by the first storage controller, prior to said detecting.

6. The method of claim 2, wherein said the first storage controller writing the failure analysis information to the second storage controller comprises:
   periodically writing, by the first storage controller, the failure analysis information to the second storage controller, via the inter-controller link, prior to the failure.

7. The method of claim 6, further comprising:
   generating, by the first storage controller, additional failure analysis information after detecting the failure.

8. The method of claim 7, further comprising:
writing, by the first storage controller, the additional failure analysis information to the second storage controller, via the inter-controller link, after said generating.

9. The method of claim 7, further comprising:
detecting, by the second storage controller, the failure; and
reading, by the second storage controller, the failure analysis information from the first storage controller, via the inter-controller link, in response to said detecting.

10. The method of claim 1, wherein said transferring the failure analysis information comprises:
reading, by the second storage controller, the failure analysis information from the first storage controller, via the inter-controller link.

11. The method of claim 10, further comprising:
detecting, by the first storage controller, the failure; and
notifying the second storage controller of the failure, by the first storage controller, via the inter-controller link, in response to said detecting;
wherein the second storage controller performs said reading the failure analysis information in response to said notifying.

12. The method of claim 11, further comprising:
collecting, by the first storage controller, the failure analysis information, in response to said detecting.

13. The method of claim 12, wherein said collecting comprises:
collecting, by the first storage controller, the failure analysis information in a memory of the first storage controller, wherein said reading comprises the second storage controller reading the failure analysis information from the first storage controller memory, via the inter-controller link.

14. The method of claim 12, further comprising:
periodically collecting, by the first storage controller, the failure analysis information, prior to the failure.

15. The method of claim 10, further comprising:
detecting, by the second storage controller, the failure;
wherein the second storage controller performs said reading the failure analysis information in response to said detecting.

16. The method of claim 15, further comprising:
periodically collecting, by the first storage controller, the failure analysis information, prior to the failure.

17. The method of claim 10, wherein said the second storage controller reading the failure analysis information from the first storage controller comprises:
performing, by the second storage controller, a direct memory access (DMA) read operation of the failure analysis information from a memory of the first storage controller to a memory of the second storage controller via the inter-controller link.

18. The method of claim 17, wherein the inter-controller link comprises a PCI-Express link, wherein said performing a direct memory access (DMA) read operation comprises:
transmitting, by the second storage controller, a PCI-Express memory read request transaction layer packet (TLP) to the first storage controller; and
transmitting, by the first storage controller, at least one PCI-Express memory write request TLP to the second storage controller, wherein the failure analysis information is contained in a payload portion of the at least one PCI-Express memory write request TLP.

19. The method of claim 10, wherein said the second storage controller reading the failure analysis information from the first storage controller comprises:
performing a plurality of load operations of the failure analysis information, by a CPU of the second storage controller, from a memory of the first storage controller via the inter-controller link.

20. The method of claim 19, wherein the inter-controller link comprises a PCI-Express link, wherein said performing a plurality of load operations comprises:
transmitting, by the second storage controller, a PCI-Express memory read request transaction layer packet (TLP) to the first storage controller; and
transmitting, by the second storage controller, at least one PCI-Express memory write request TLP to the first storage controller, wherein the failure analysis information is contained in a payload portion of the at least one PCI-Express memory write request TLP.

21. The method of claim 10, wherein said the second storage controller reading the failure analysis information from the first storage controller comprises:
reading the failure analysis information, by the second storage controller, without involvement by a CPU of the first storage controller.

22. The method of claim 10, wherein said the second storage controller reading the failure analysis information from the first storage controller comprises:
reading the failure analysis information, by the second storage controller, independent of whether a CPU of the first storage controller is operational.

23. The method of claim 1, further comprising:
detecting, by the first storage controller, the failure;
wherein the first storage controller performs said transferring the failure analysis information, in response to said detecting.

24. The method of claim 23, wherein said the first storage controller detecting the failure comprises the first storage controller detecting the failure while the first storage controller is booting up.

25. The method of claim 1, further comprising:
detecting, by the second storage controller, the failure;
wherein the second storage controller performs said transferring the failure analysis information, in response to said detecting.

26. The method of claim 1, wherein the inter-controller link comprises a PCI-Express link.

27. The method of claim 26, wherein said transferring the failure analysis information from the first storage controller to the second storage controller comprises transferring the failure analysis information from a memory of the first storage controller directly to a memory of the second storage controller via the PCI-Express link.

28. The method of claim 1, further comprising:
writing the failure analysis information, by the first storage controller, to a disk drive connected to the first and second storage controllers.

29. The method of claim 28, further comprising:
reading the failure analysis information, by the second storage controller, from the disk drive, prior to said providing the failure analysis information to the operator.

30. The method of claim 1, further comprising:
writing the failure analysis information, by the second storage controller, to a disk drive connected to the first and second storage controllers, after said transferring.

31. The method of claim 30, further comprising:
reading the failure analysis information, by the second storage controller, from the disk drive, prior to said providing the failure analysis information to the operator.

32. The method of claim 1, wherein the failure analysis information comprises:
text messages generated by firmware executing on a CPU of the first controller.

33. The method of claim 32, wherein the text messages indicate that predetermined portions of firmware routines have been executed by the CPU.

34. The method of claim 32, wherein the text messages specify characteristics of a new disk drive that has been discovered by the first controller.

35. The method of claim 32, wherein the text messages include a timestamp of a time when the message was generated.

36. The method of claim 32, wherein the text messages include an indication of which module of the firmware generated the message.

37. The method of claim 32, further comprising:
generating, by the CPU of the first storage controller, the text messages to a volatile memory of the first storage controller, prior to said transferring;
wherein said transferring comprises transferring the text messages from the volatile memory of the first storage controller to the second storage controller.

38. The method of claim 32, wherein the text messages indicate an occurrence of a system-level event.

39. The method of claim 38, wherein the system-level event comprises creation of a redundant array of disks.

40. The method of claim 38, wherein the system-level event comprises deletion of a redundant array of disks.

41. The method of claim 38, wherein the system-level event comprises a temperature of a component of the first storage controller has exceeded a predetermined threshold.

42. The method of claim 38, wherein the system-level event comprises a failure of a rechargeable energy source for providing power to the first storage controller during a loss of main power.

43. The method of claim 38, wherein the system-level event comprises a capacitor for providing power to the first storage controller during a loss of main power has been recharged beyond a predetermined level.

44. The method of claim 1, wherein the failure analysis information comprises:
a crash dump of system software executing on a CPU of the first storage controller.

45. The method of claim 44, wherein the crash dump comprises a listing of contents of registers of the CPU.

46. The method of claim 44, wherein the crash dump comprises a listing of contents of a memory stack of the CPU.

47. The method of claim 1, wherein the failure comprises overheating of a component of the first storage controller.

48. The method of claim 1, wherein the failure comprises a memory parity error of the first storage controller.

49. The method of claim 1, wherein the failure comprises a memory ECC error of the first storage controller.

50. The method of claim 1, wherein the failure comprises invalid data received from a network interface controller of the first storage controller.

51. The method of claim 1, wherein the failure comprises invalid data received from a storage interface controller of the first storage controller.

52. The method of claim 1, wherein the failure comprises an invalid pointer detected by firmware executing on a CPU of the first storage controller.

53. A redundant storage controller system, comprising:
first and second redundant storage controllers, coupled together by a communications link, each storage controller of the first and second storage controllers comprising:
a CPU, configured to generate information for use in analysis of a failure of the storage controller;
a memory, configured to receive the information from the other, failed storage controller via the communications link; and
an interface, coupled to the memory, configured to receive a command from an operator of the system, and in response to the command, to provide from the memory of the storage controller the information that was received from the other, failed storage controller;
wherein the interface of the non-failed storage controller is configured to provide the information to the operator before the failed storage controller is rebooted.

54. The system of claim 53, wherein the CPU of the failed storage controller is further configured to cause the information to be transferred from the failed storage controller to the non-failed storage controller via the communications link.

55. The system of claim 54, wherein the CPU of the failed storage controller is further configured to detect the failure and to cause the information to be transferred in response to detecting the failure.

56. The system of claim 55, wherein the CPU of the failed storage controller is further configured to collect the information in response to detecting the failure, and prior to causing the information to be transferred.

57. The system of claim 56, wherein the CPU of the failed storage controller is further configured to periodically collect the information prior to detecting the failure.

58. The system of claim 54, wherein the CPU of the failed storage controller periodically causes the information to be transferred, prior to the failure.

59. The system of claim 58, wherein the CPU of the failed storage controller is further configured to generate additional failure analysis information after the failure.

60. The system of claim 59, wherein the CPU of the failed storage controller is further configured to cause the additional failure analysis information to be transferred from the failed storage controller to the non-failed storage controller, via the communications link.

61. The system of claim 59, wherein the CPU of the non-failed storage controller is configured to detect the failure of the failed storage controller and to cause the additional failure analysis information to be transferred from the failed storage controller to the non-failed storage controller, in response to detecting the failure.

62. The system of claim 53, wherein the CPU of the non-failed storage controller is configured to cause the information to be transferred from the failed storage controller to the non-failed storage controller, via the communications link.

63. The system of claim 62, wherein the CPU of the failed storage controller is further configured to detect the failure, and notify the non-failed storage controller of the failure, wherein the CPU of non-failed storage controller is configured to cause the information to be transferred in response to the notification.

64. The system of claim 63, wherein the CPU of the failed storage controller is further configured to collect the information, in response to detecting the failure.

65. The system of claim 64, wherein the CPU of the failed storage controller is configured to collect the information in the memory of the failed storage controller, wherein the CPU of the non-failed storage controller is configured to cause the information to be transferred from the failed storage controller memory.

66. The system of claim 64, wherein the CPU of the failed storage controller is further configured to periodically collect the information, prior to the failure.

67. The system of claim 62, wherein the CPU of non-failed storage controller is configured to detect the failure and to cause the information to be transferred, in response to detecting the failure.

68. The system of claim 67, wherein the CPU of the failed storage controller is further configured to periodically collect the information, prior to the failure.

69. The system of claim 62, wherein each of the storage controllers further comprises:
   a direct memory access controller (DMAC), coupled to the memory, configured to transfer the information from the memory of the failed storage controller to the memory of the non-failed storage controller, via the communications link.

70. The system of claim 69, wherein said communications link comprises a PCI-Express link, wherein each of the storage controllers further comprises:
   a PCI-Express interface, configured for coupling to the PCI-Express link;
   wherein the DMAC is configured to cause the PCI-Express interface of the non-failed storage controller to transmit a PCI-Express memory read request transaction layer packet (TLP) to the failed storage controller on the communications link;
   wherein the PCI-Express interface of the failed storage controller is configured to transmit at least one PCI-Express memory write request TLP to the non-failed storage controller, in response to the memory read request TLP, wherein the information is contained in a payload portion of the at least one PCI-Express memory write request TLP.

71. The system of claim 62, wherein the CPU of the non-failed storage controller is configured to transfer the information by performing a plurality of load operations of the information from the failed storage controller, via the communications link.

72. The system of claim 71, wherein the communications link comprises a PCI-Express link, wherein each of the storage controllers further comprises:
   a PCI-Express interface, configured for coupling to the PCI-Express link;
   wherein the PCI-Express interface of the non-failed storage controller is configured to transmit at least one PCI-Express memory read request transaction layer packet (TLP) to the failed storage controller on the communications link, in response to the plurality of load operations;
   wherein the PCI-Express interface of the failed storage controller is configured to transmit at least one PCI-Express memory write request TLP to the non-failed storage controller, in response to the memory read request TLP, wherein the information is contained in a payload portion of the at least one PCI-Express memory write request TLP.

73. The system of claim 62, wherein the CPU of the non-failed storage controller is configured to cause the information to be transferred from the failed storage controller to the non-failed storage controller, without involvement by the CPU of the failed storage controller.

74. The system of claim 62, wherein the CPU of the non-failed storage controller is configured to cause the information to be transferred from the failed storage controller to the non-failed storage controller, independent of whether a CPU of the failed storage controller is operational.

75. The system of claim 53, wherein the CPU of the failed storage controller is further configured to detect the failure and to cause the information to be transferred, in response to detecting the failure.

76. The system of claim 75, wherein the CPU of the failed storage controller is further configured to detect the failure while the failed storage controller is booting up.

77. The system of claim 53, wherein the CPU of the non-failed storage controller is further configured to detect the failure and to cause the information to be transferred, in response to detecting the failure.

78. The system of claim 53, wherein the communications link comprises a PCI-Express link.

79. The system of claim 53, wherein the CPU of the failed storage controller is further configured to write the information to a disk drive connected to the first and second storage controllers.

80. The system of claim 79, wherein the CPU of the non-failed storage controller is configured to read the information from the disk drive, prior to providing the information to the operator.

81. The system of claim 53, wherein the CPU of the non-failed storage controller is configured to write the information to a disk drive connected to the first and second storage controllers, after the information is transferred to the non-failed storage controller.

82. The system of claim 81, wherein the CPU of the non-failed storage controller is configured to read the information from the disk drive, prior to providing the information to the operator.

83. The system of claim 53, wherein each of the first and second storage controllers comprises a redundant array of inexpensive disks (RAID) controller.

84. A storage controller, comprising:
   a PCI-Express interface, configured to couple to a PCI-Express link, and configured to receive thereon from a failed storage controller coupled thereto information for use in analysis of a failure of the failed storage controller;
   a memory, coupled to the PCI-Express interface, configured to store the received information; and
   an operator interface, coupled to the memory, configured to receive a command from an operator of the storage controller, and to responsively provide to the operator the received information.

85. The storage controller of claim 84, wherein the operator interface comprises an Ethernet interface.

86. The storage controller of claim 84, wherein the operator interface comprises an RS-232 interface.

87. The storage controller of claim 84, wherein the operator interface comprises a Fibre Channel interface.

* * * * *